T862003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 21

768,945

SHAPED ARTICLES OF FLUORINE-CONTAINING POLYMERS FILLED WITH CARBONACEOUS MATERIAL

David Evan Bryan Morgans, Hatfield, England, assignor to Imperial Chemicals Industries Limited, London, England, a corporation of Great Britain

Continuation of application Ser. No. 596,574, Nov. 23, 1966. This application Aug. 21, 1968. Published May 6, 1969

Claims priority, application Great Britain, Nov. 24, 1965, 49,944/65

Int. Cl. C23c *9/04*

U.S. Cl. 117—46

1 Sheet Drawing. 15 Pages Specification

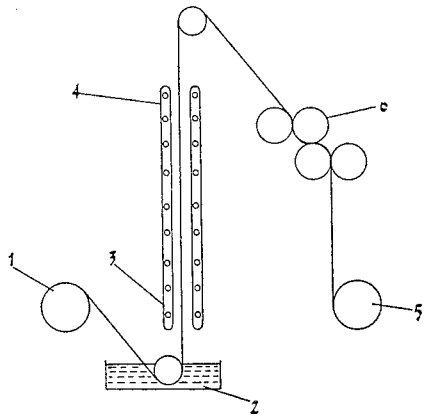

Shaped articles of fluorine-containing polymers filled with carbonaceous material obtained by impregnating a supporting structure, capable of charring at or below the sintering temperature of the fluorine-containing polymer without substantial loss of shape, with a liquid dispersion of fluorine-containing polymer, and drying the impregnated structure and heating it at a temperature sufficiently high to sinter the polymer.

The preferred fluorine-containing polymer is polytetrafluoroethylene. Although for some fillers it may be necessary to exceed 400° C. for brief periods, the preferred sintering temperatures are 370 to 390° C. Copolymers of tetrafluoroethylene with minor amounts (up to about 10% by weight) of other unsaturated monomeric material (e.g. hexafluoropropene or ethylene) may also be used when such copolymers exhibit the low coefficient of friction and excellent resistance to chemical attack and dimensional change at high temperatures that are associated with a homopolymer of tetrafluoroethylene.

The supporting structure may be cellulose material such as paper, papier mache, or cotton fabrics and articles made from synthetic fibers such as polyacrylonitrile and polyvinylidene chloride. The articles can contain 80% by weight of PTFE and more, balance carbonaceous material. Non-volatile residues may also be present in the supporting material.

May 6, 1969 D. E. B. MORGANS DEF. PUB. T862003
SHAPED ARTICLES OF FLUORINE-CONTAINING POLYMERS FILLED WITH CARBONACEOUS MATERIAL SN - 768945
Original Filed Nov. 23, 1966
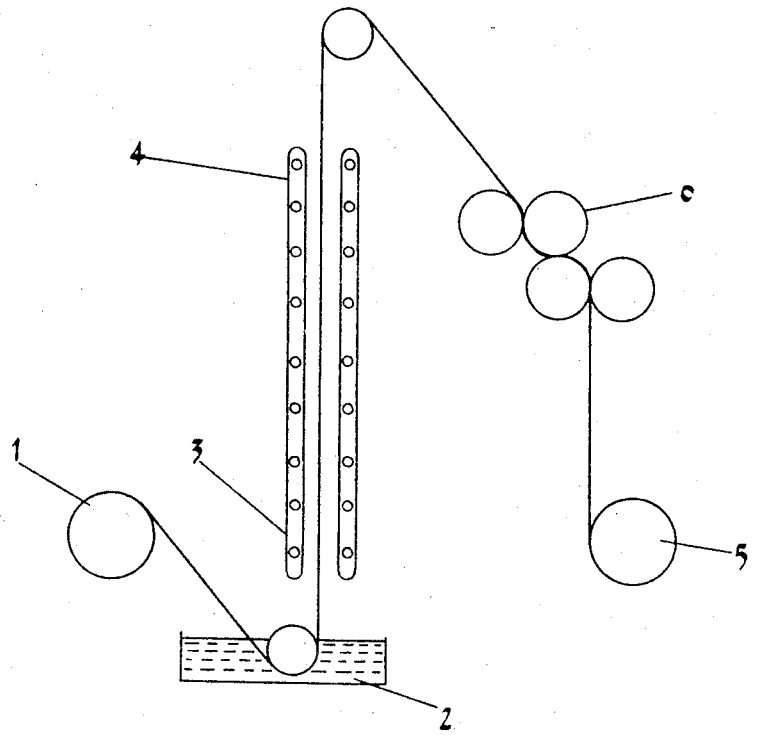
INVENTOR
DAVID EVAN BRYAN MORGANS
By Cushman, Darby & Cushman
ATTORNEYS